(12) United States Patent
Rote et al.

(10) Patent No.: US 7,431,582 B2
(45) Date of Patent: Oct. 7, 2008

(54) MOLDING MACHINE

(75) Inventors: B. Jack Rote, Sturgis, MI (US); Vance E. Reed, Columbia City, IN (US); Richard E. Zorger, Columbia City, IN (US)

(73) Assignee: Rexam Closure Systems Inc., Perrysburg, OH (US)

( * ) Notice: Subject to any disclaimer, the term of this patent is extended or adjusted under 35 U.S.C. 154(b) by 356 days.

(21) Appl. No.: 11/155,354

(22) Filed: Jun. 17, 2005

(65) Prior Publication Data
US 2006/0286190 A1 Dec. 21, 2006

(51) Int. Cl.
*B28B 5/00* (2006.01)
(52) U.S. Cl. ............. 425/348 R; 425/412; 425/809
(58) Field of Classification Search ............ 425/259, 425/348 R, 408, 412, 349, 422, 423, 809
See application file for complete search history.

(56) References Cited

U.S. PATENT DOCUMENTS

| | | | |
|---|---|---|---|
| 3,918,875 A | 11/1975 | Phillipson et al. | |
| 3,941,547 A | 3/1976 | Hunyar et al. | |
| 4,245,811 A | 1/1981 | Brunner et al. | |
| 4,648,546 A | 3/1987 | Gellert | |
| 4,812,116 A * | 3/1989 | Abrams | 425/547 |
| 5,670,100 A * | 9/1997 | Ingram | 264/40.5 |
| 5,786,079 A * | 7/1998 | Alieri | 425/349 |
| 5,855,933 A | 1/1999 | Schmetz | |
| 5,935,621 A | 8/1999 | Gellert et al. | |
| 6,736,628 B1 | 5/2004 | Zuffa | |
| 2004/0166193 A1 | 8/2004 | Parrinello et al. | |

FOREIGN PATENT DOCUMENTS

JP 2-75440 3/1990

* cited by examiner

*Primary Examiner*—Yogendra Gupta
*Assistant Examiner*—Maria Veronica D Ewald
(74) *Attorney, Agent, or Firm*—Reising, Ethington, Barnes, Kiselle, P.C.

(57) ABSTRACT

A mold core includes a forming pin having a hollow interior and an end wall. A passage, preferably in the form of a hollow tube, extends into the hollow interior of the forming pin and has an end sealingly secured at a position spaced from the end wall of the forming pin. A poppet valve is disposed on the end wall of the forming pin. The poppet valve is responsive to air pressure within the passage to open and permit flow of air through the end wall of the forming pin to assist stripping of molded articles from the mold core. The poppet valve includes a valve element having an outer end at the end face of the forming pin and an inner end adjacent to the end of the passage. A spring preferably biases the valve element to a closed position. The spring preferably comprises a coil spring captured in compression between the valve element and the forming pin.

5 Claims, 14 Drawing Sheets

MOLDING MACHINE

The present disclosure is directed to a machine for molding plastic articles, such as closure shells or sealing liners within closure shells.

BACKGROUND AND SUMMARY OF THE DISCLOSURE

Machines for molding closure shells, or molding sealing liners within closure shells, typically include a turret or carousel that rotates around a vertical axis. A plurality of molds are provided around the periphery of the carousel, in the form of male and female mold sections that are aligned along vertical axes parallel to the axis of rotation. Cams drive one or both of the mold sections of each pair between an open position, in which a molded part is stripped from the male mold section and a charge of plastic material is placed in the female mold section, and a closed position in which the male and female mold sections are brought together to compression mold the shell or liner. In a liner machine, premade shells are placed in a nest when the mold sections are open, and a charge or pellet of liner material is placed within the shell before the molds are closed. U.S. Patents that illustrate machines of this type for compression molding plastic closure shells include U.S. Pat. Nos. 5,670,100, 5,989,007, 6,074,583 and 6,478,568. U.S. Patents that illustrate machines of this type for compression molding sealing liners within closure shells include U.S. Pat. No. 5,451,360.

Although vertical axis carousel-type machines of the noted type have enjoyed substantial commercial acceptance and success, innovation remains desirable. In particular, in vertical axis carousel-type machines, the mold forces and the weight of the rotating equipment are parallel to the vertical axis of rotation, creating a bending moment with respect to the axis of rotation and the bearings and shaft that support the carousel. Carousel-type machines also require a substantial amount of valuable floor space in a manufacturing facility. It is a general object of the present disclosure, in accordance with one aspect of the disclosure, to provide a method and apparatus for compression molding plastic articles, such as plastic closures and plastic liners within closure shells, which reduce the forces applied to the support frame and bearings, reduce maintenance requirements and the amount of energy needed to operate the machine, and/or reduce the amount of floor space required per machine.

The present disclosure involves a number of aspects that can be implemented separately from or in combination with each other.

A mold core in accordance with one aspect of the present disclosure, which can be implemented for either compression and injection molding, includes a forming pin having a hollow interior and an end wall. A passage, preferably in the form of a hollow tube, extends into the hollow interior of the forming pin and has an end sealingly secured at a position spaced from the end wall of the forming pin. A poppet valve is disposed on the end wall of the forming pin. The poppet valve is operatively coupled to the forming pin and responsive to movement of the forming pin during operation to open the poppet valve and assist stripping of molded articles from the mold core. In the preferred embodiment, a spool valve feeds air under pressure through an air passage to open the poppet valve. The poppet valve includes a valve element having an outer end at the end face of the forming pin and an inner end adjacent to the end of the passage. A spring preferably biases the valve element to a closed position. The spring preferably comprises a coil spring captured in compression between the valve element and the forming pin.

A mold cavity in accordance with another aspect of the disclosure, for either compression or injection molding plastic articles, is adapted to be secured in a pocket on a molding machine having coolant feed and return passages opening into the pocket. The mold cavity includes a mold cavity seat adapted to be received in the pocket and a mold cavity insert secured within the seat. The seat and insert have opposed surfaces that form first coolant passages between the seat and the insert, and the seat has second coolant passages for connection to the feed and return passages in the machine for circulating coolant from the machine through the mold cavity and back to the machine. The second coolant passages in the cavity seat preferably are such that the mold cavity, including both the seat and the insert, are adapted to be rotated within the pocket selectively to open and close the first and second passages to coolant flow. The cavity preferably includes indicia for registry with indicia on the cavity support to indicate whether the first and second passages are open or closed to coolant circulation.

In accordance with a further aspect of the present disclosure, which can be implemented for either compression molding and injection molding, a mold element, such as a mold core and/or a mold cavity, has at least two components, at least one of which has at least one surface channel that, in assembly with another component, cooperates with an opposing surface of the other component to form a passage for circulating coolant between the components. The components preferably are secured to each other by e-beam welding, which localizes the heating to the mating surfaces and allows the assembled components to cool rapidly and retain their hardnesses. E-beam welding also reduces the likelihood of distortion of the mating components, and permits accurate control of the areas to be joined. E-beam welding does not require use of a separate joining material, but rather heat-fuses the components to each other.

BRIEF DESCRIPTION OF THE DRAWINGS

The disclosure, together with additional objects, features, advantages and aspects thereof, will best be understood from the following description, the appended claims and the accompanying drawings, in which:

DETAILED DESCRIPTION OF PREFERRED EMBODIMENTS

The disclosure of U.S. application Ser. No. 11/109,374, filed Apr. 19, 2005, is incorporated herein by reference.

Figure 1:
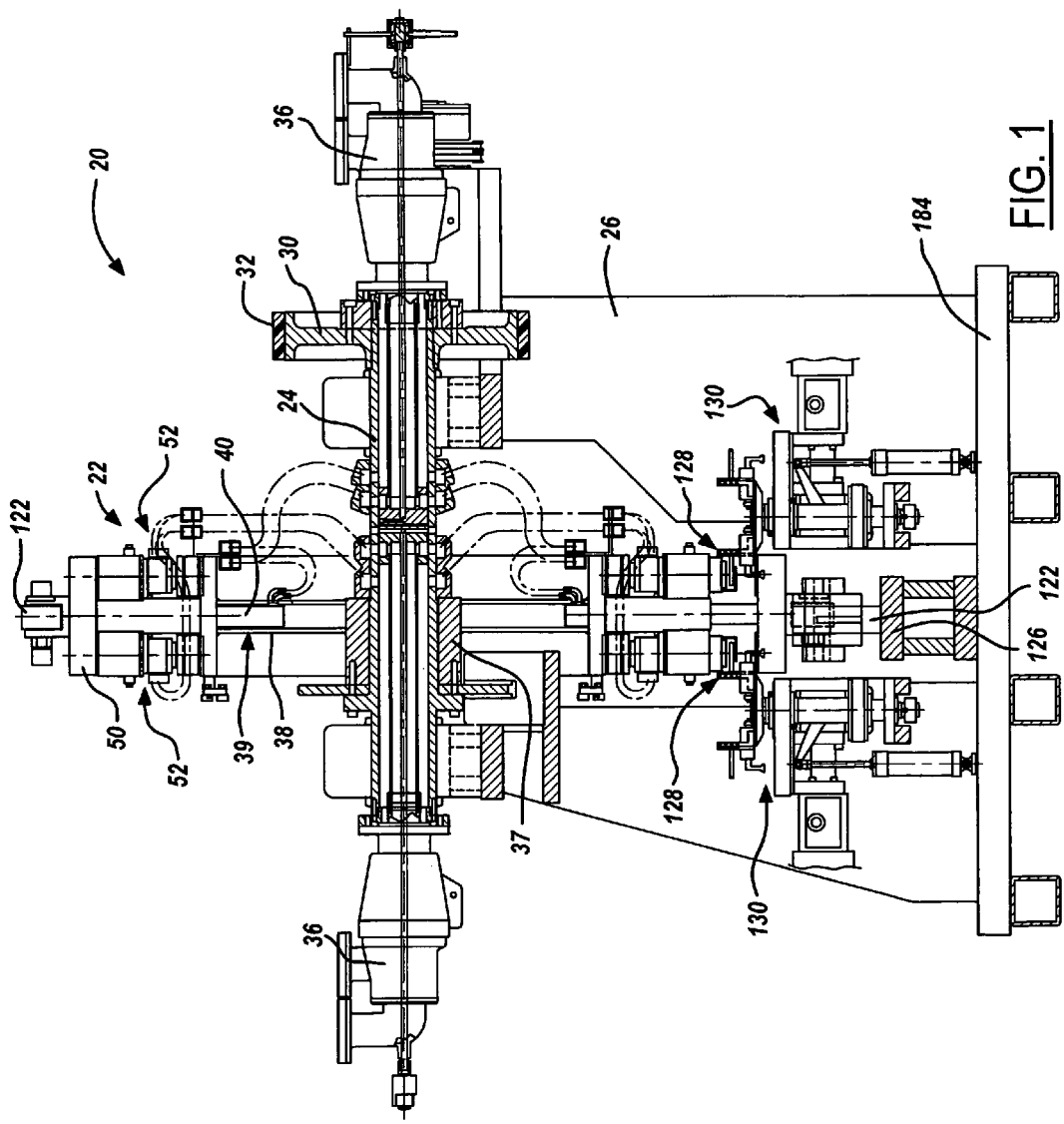
FIG. 1 is a front elevational view of a compression molding machine in accordance with one presently preferred embodiment of the disclosure.
Figure 2:
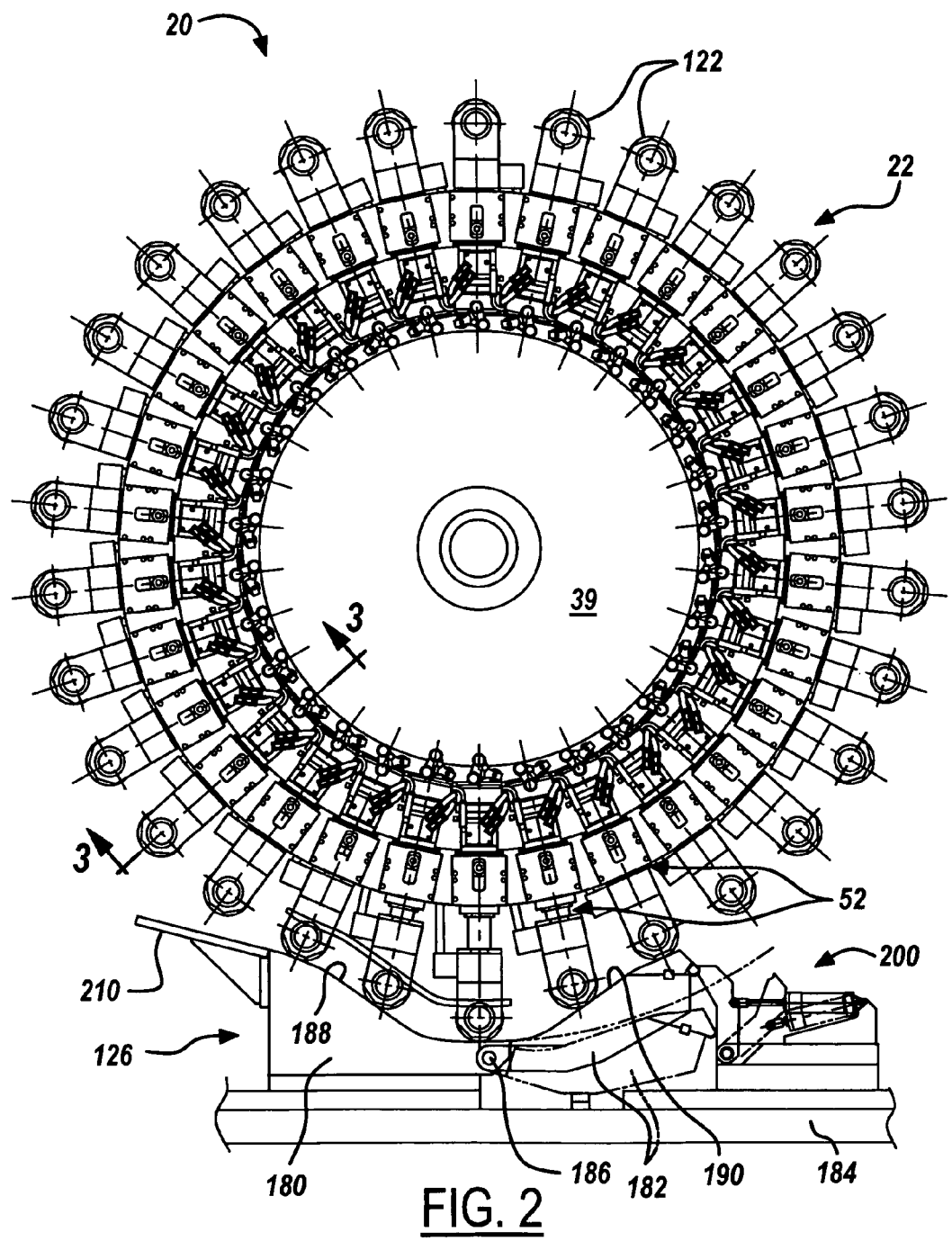
FIG. 2 is a side elevational view of the compression molding machine illustrated in FIG. 1.

FIGS. 1-2 illustrate a machine 20 for compression molding plastic closure shells. Machine 20 includes a wheel 22 mounted on a shaft 24 between spaced supports 26. Shaft 24 is coupled by a pulley 30 and a belt 32 to a motor for rotating shaft 24 and wheel 22 around a horizontal axis. Wheel 22 includes a hub 37 (which may be part of shaft 24) and a support 39 extending radially from hub 37. Support 39 may comprise a disk or the like, or may be in the form of a plurality of angularly spaced radially extending support spokes 38. Each support spoke 38 is hollow at its outer end. A rod 40 is slidably supported by sleeve bearings 42 (FIGS. 3B-3C) within the hollow outer end of each spoke 38. A crossbar 50 is coupled to the end of each rod 40, so that the combination of rod 40 and bar 50 is generally T-shaped as viewed from the tangential direction in FIG. 1. A pair of radially spaced external supports 44, 46 (FIGS. 3B-3C) are provided on each spoke 38. A plurality of angularly spaced molds 52 are disposed around the periphery of wheel 22, preferably on both sides of the wheel. Each mold 52 is disposed between supports 44, 46 on an associated spoke 38 and an end of crossbar 50 on rod 40. All of the molds 52 preferably are identical.

Figure 3A:
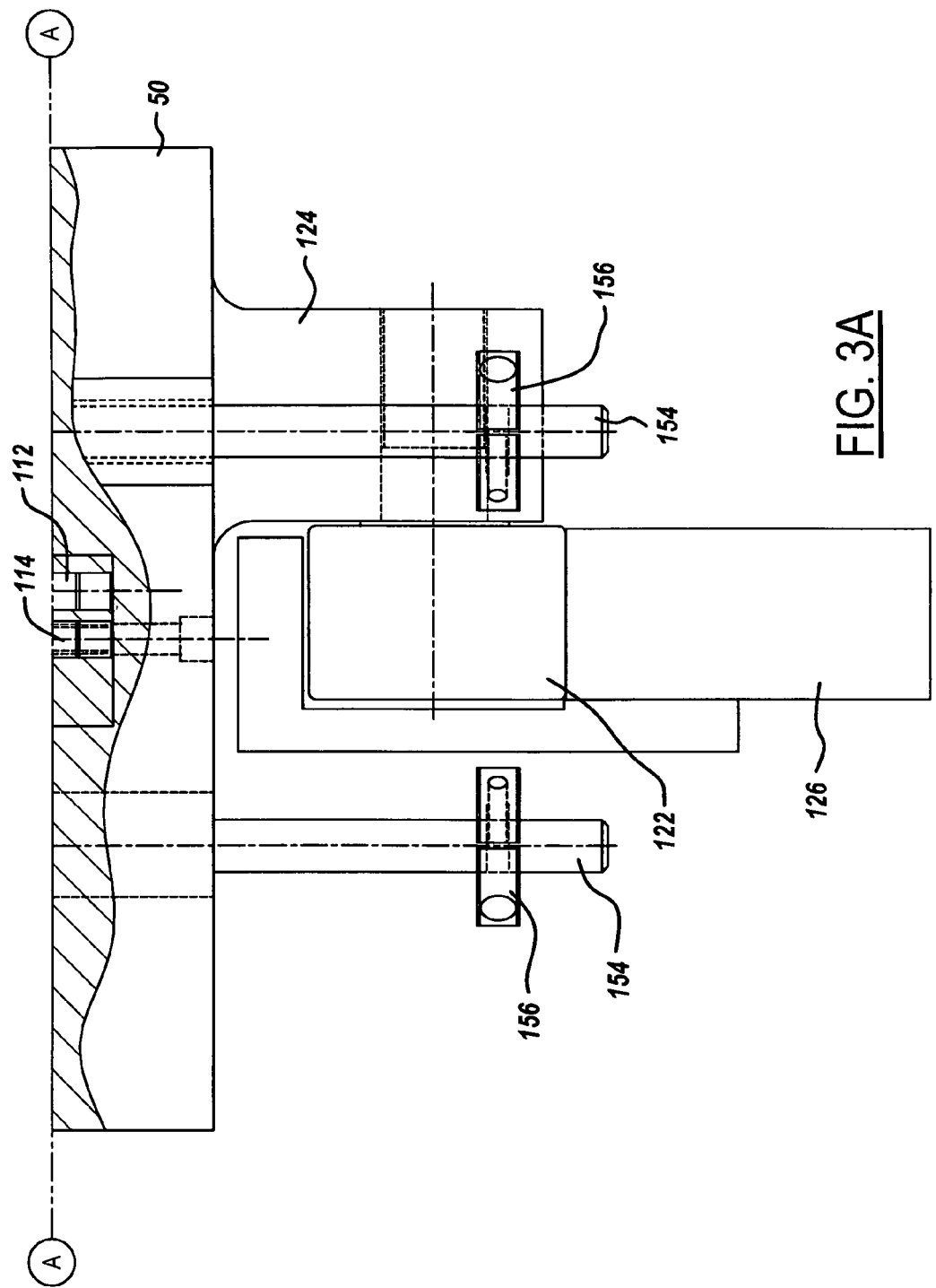
FIGS. 3A-3D together form a sectional view taken substantially along the line 3-3 in FIG. 2.
Figure 3B:
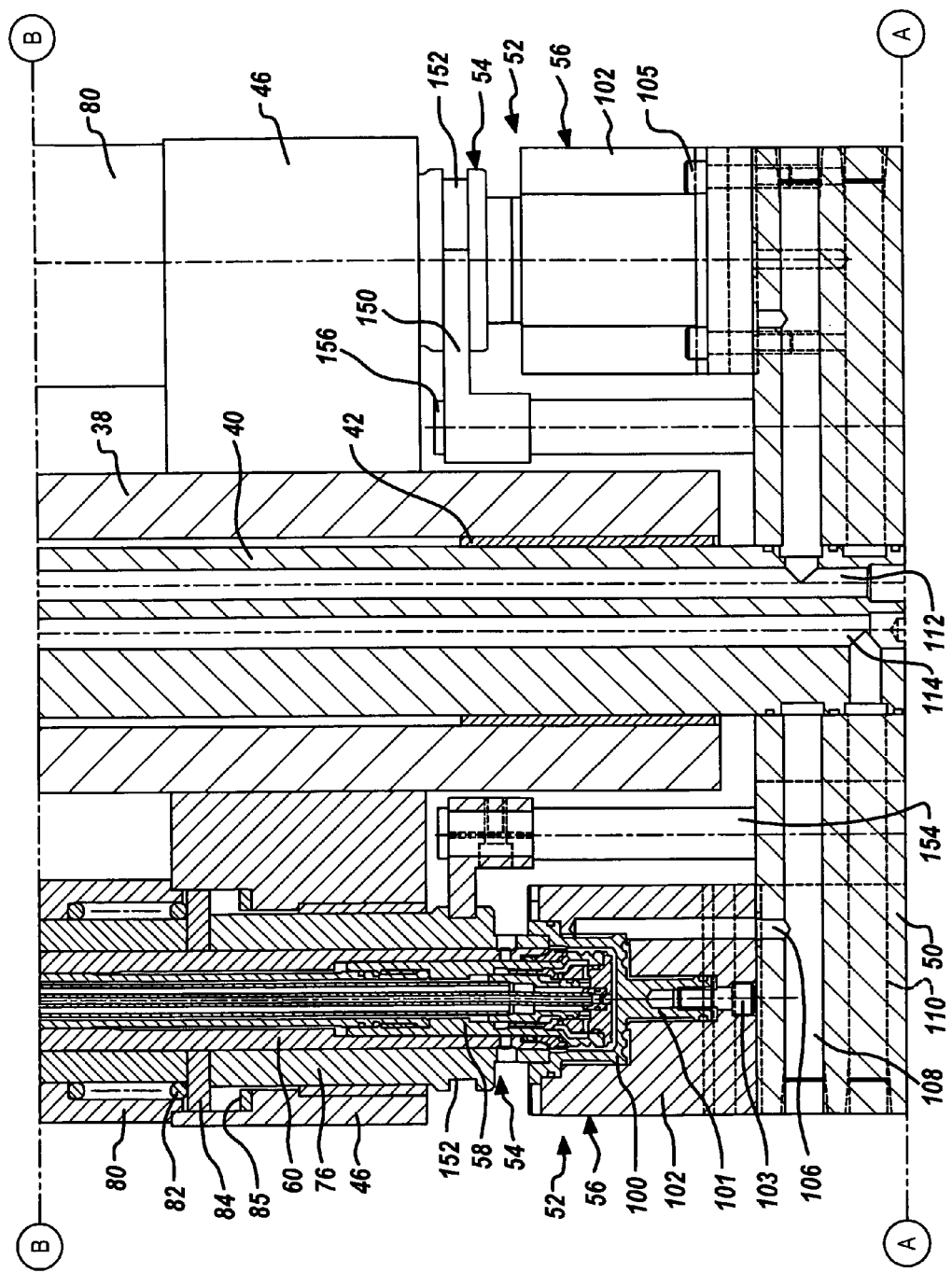
Figure 3C:
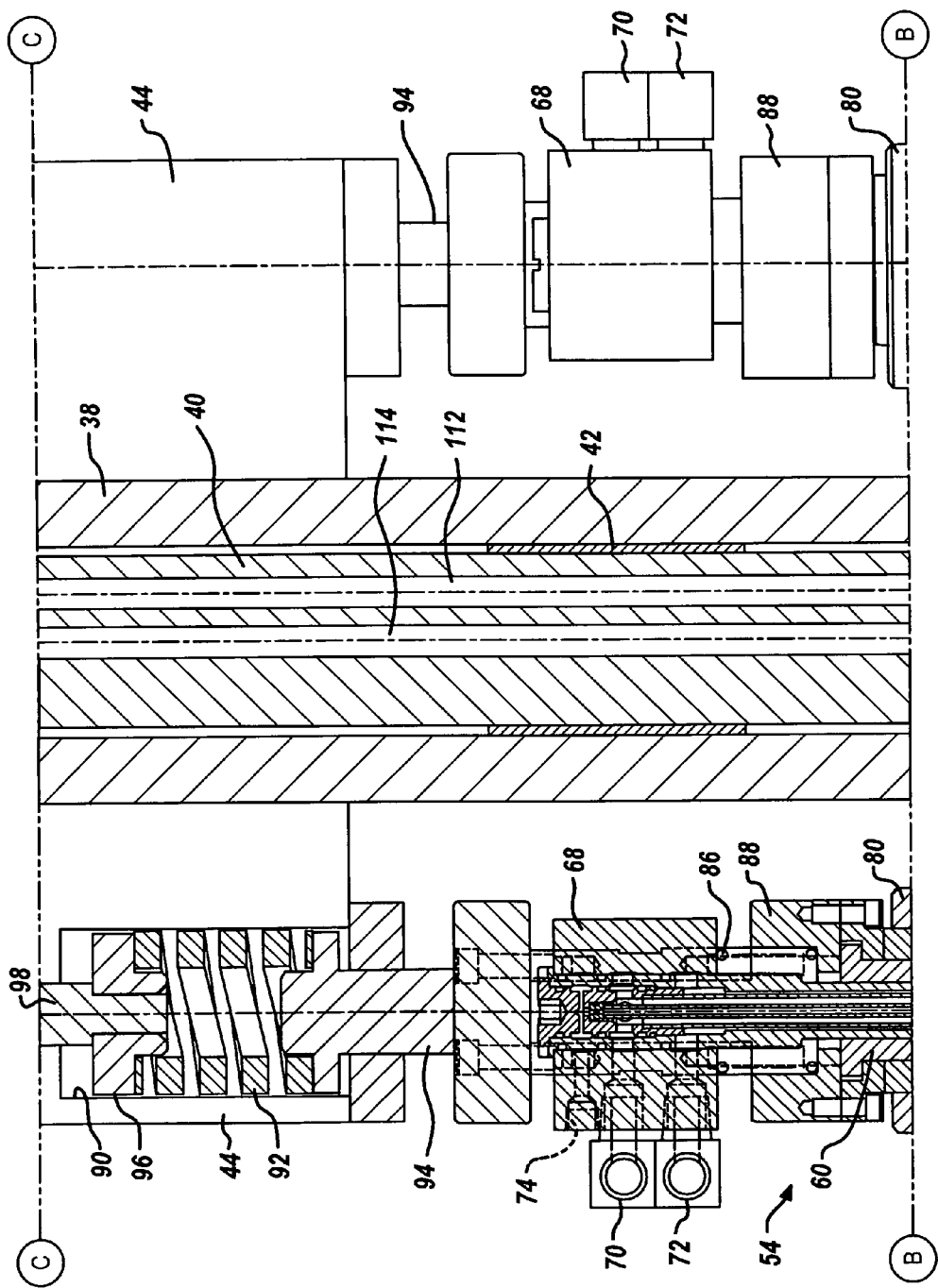
Figure 3D:
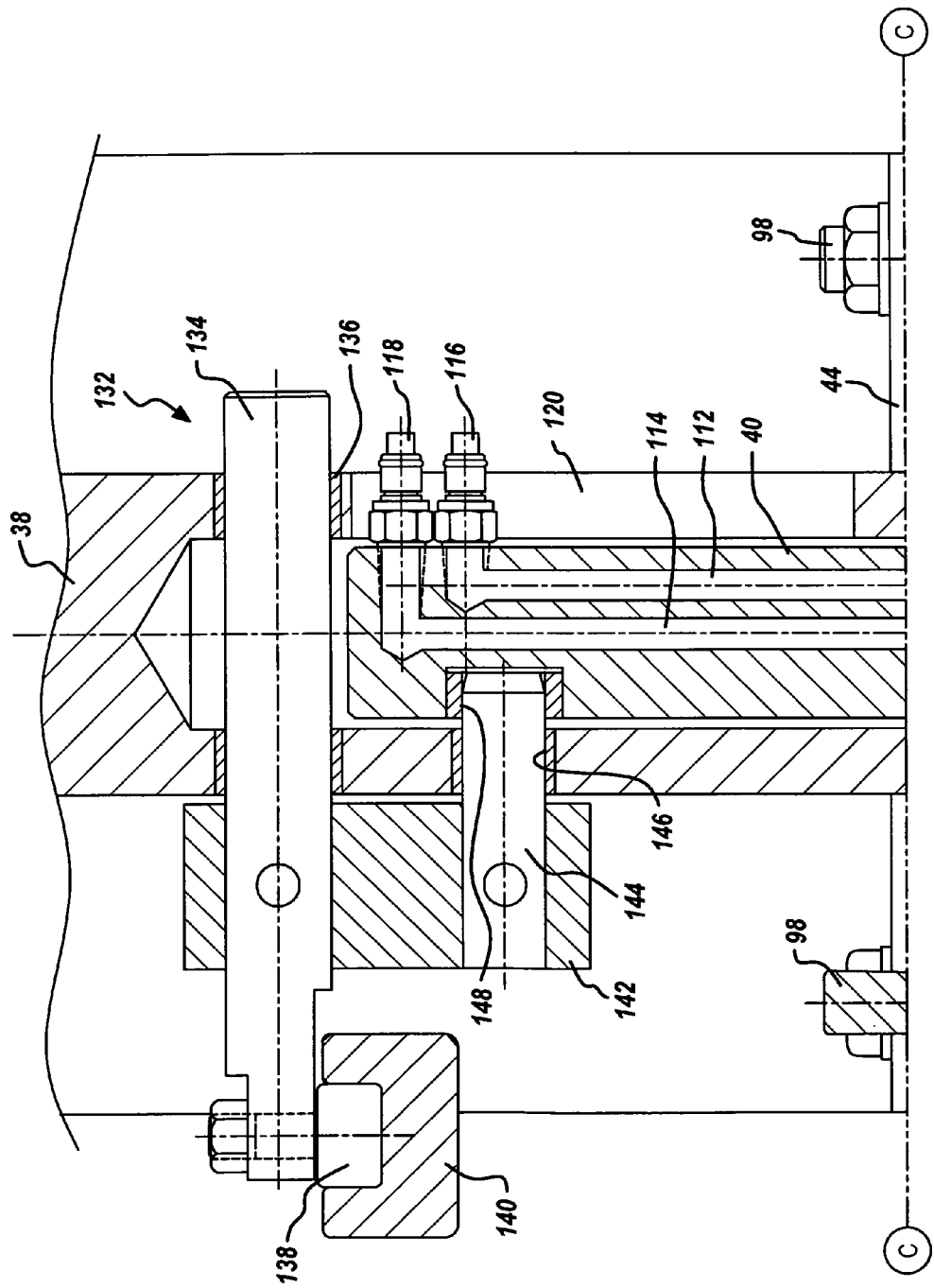
Figure 4:
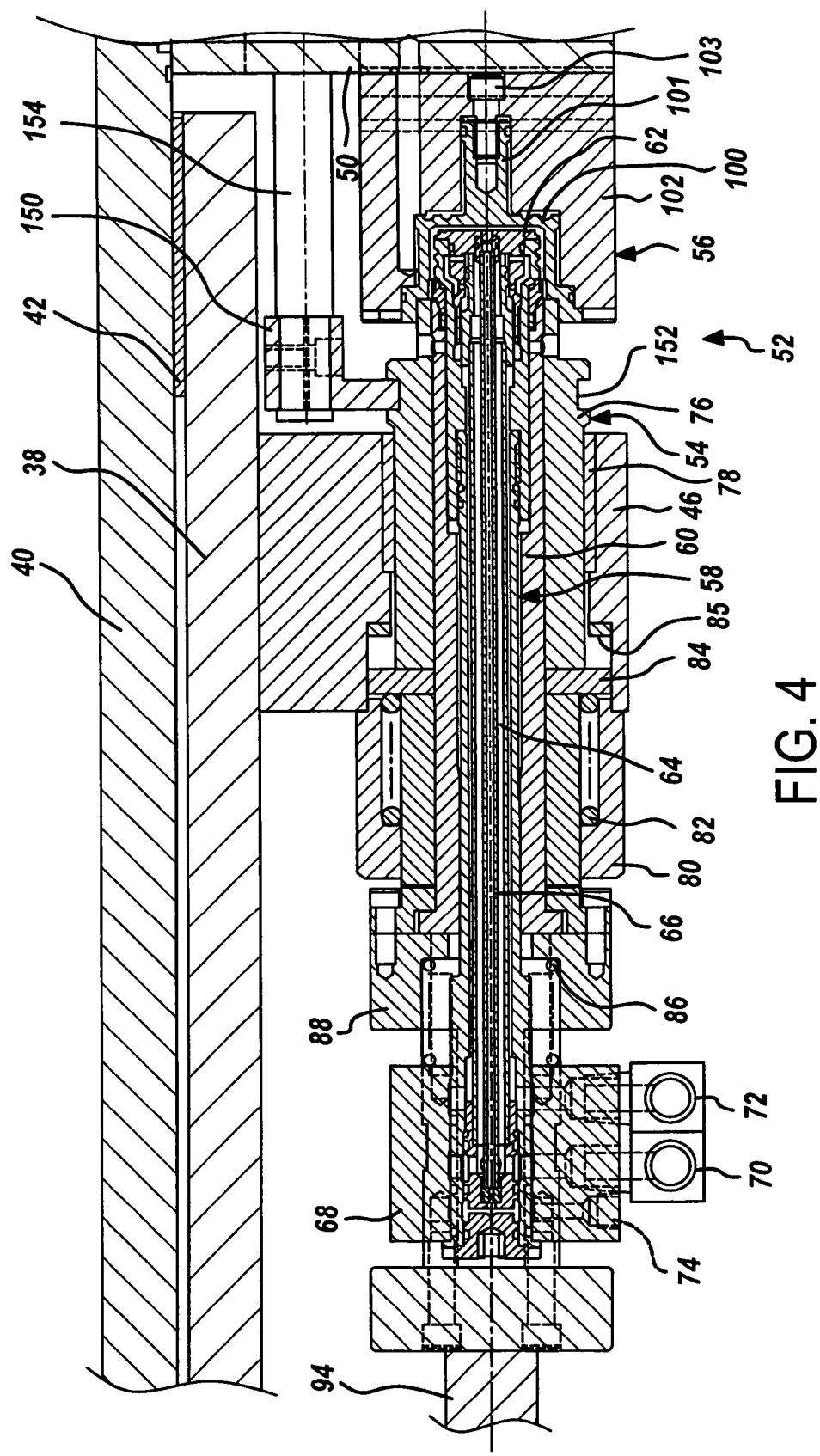
FIG. 4 is an enlarged view of a portion of FIGS. 3B-3C illustrating one of the mold segment pairs.

Each mold 52 includes a radially inner first mold section or segment 54 and a second mold section or segment 56 in radially outward alignment with an associated first mold segment 54 (FIGS. 3B-3C and 4). In the illustrated embodiments, the radially inner first mold segment 54 is a male mold segment, and the radially outer second mold segment 56 is a female mold segment, although these mold segments could be reversed in accordance with the broadest principles of the disclosure. First or male mold segment 54 includes a mold core 58 slidably mounted within a surrounding sleeve 60 (FIG. 4). Mold core 58 has an end or tip 62 contoured for compression molding the inside surfaces of a closure shell in the embodiment of FIGS. 1-3D and 4 (and the embodiment of FIGS. 5A-5B). A first or outer tube 64 extends coaxially through the hollow interior of mold core 58 forming a first annular passage between the exterior surface of tube 64 and the interior surface of core 58. A second tube or other passage 66 extends through the interior of tube 64, preferably coaxially with tube 64 and core 58, forming a second annular passage between the exterior surface of tube 66 and the interior surface of tube 64. The second annular passage between tubes 64, 66 is coupled at a manifold block 68 to a coolant inlet fitting 70. Likewise, the first annular passage between tube 64 and core 58 is coupled at manifold block 68 to a coolant outlet fitting 72. (The "inlet" and "outlet" functions can be reversed.) Thus, coolant can be fed from fitting 70 through the second passage between tubes 64,66 to the tip 62 of core 58, and thence through the first passage between tube 64 and core 58 to outlet fitting 72. An inlet 74 on manifold block 68 is coupled to the interior of tube 66, and can be connected to a source of compressed air for example to assist stripping of closure shells from core tip 62. Manifold block 68 preferably is mounted on the radially inner end of mold core 58—i.e., the end opposite from core tip 62.

A stripper sleeve 76 (FIGS. 3B and 4) surrounds sleeve 60 and is slidably supported by a bearing 78 within support 46. A cap 80 is secured to support 46, and a coil spring 82 is captured in compression between cap 80 and a washer 84 slidably disposed within support 46 in abutment with the inner end of stripper sleeve 76. Thus, spring 82 biases stripper sleeve 76 toward the second or female mold segment 56 of each mold 52. When the mold is open, washer 84 abuts a surface 85 within support 46 to limit outward movement of stripper sleeve 76 over core 58. A second coil spring 86 (FIGS. 3C and 4) is captured in compression between manifold block 68 and an abutment 88 coupled to the end of sleeve 60. Thus, core 58 is biased by spring 86 inwardly against sleeve 60. Each support 44 (FIG. 3C) has an interior pocket 90 that opens radially outwardly toward and in alignment with the associated first mold segment 54. A coil spring 92 is captured in compression within each pocket 90 and engages an extension 94 coupled to an abutment 88 on sleeve 60. Thus, as pressure to form the closure shell or liner pushes on core 56, core 56 pushes against sleeve 60, which pushes against spring 92 to maintain forming pressure on the melt. (Coil springs 92 can be replaced by fluid springs.) Within pocket 90, spring 92 engages a plate 96 that is coupled to an adjustment screw 98 for individually adjusting the force applied by each spring 92.

Second or female mold segment 56 (FIGS. 3B and 4) preferably includes a cavity-forming insert 100 having an extension 101 that receives a screw 103 removably to mount the insert on a support block 102. Blocks 102 are removably mounted on crossbar 50 by screws 105 (FIG. 3B). Block 102 has coolant passages 106 that communicate in the illustrated embodiment with lateral passages 108,110 in crossbar 50, and thence to longitudinal radial passages 112,114 in rod 40. As best seen in FIG. 3D, passages 112,114 in rod 40 are connected to fittings 116,118 for circulation of coolant through rod 40, crossbar 50 and block 102 to cool mold cavity inserts 100. It will be noted in FIG. 3D that fittings 116,118 extend through a slot 120 in spoke 38 to permit radial movement of rod 40 with respect to spoke 38.

A cam follower roller 122 (FIGS. 1, 2, 3A) is rotatably mounted on a leg 124 that extends radially outwardly from crossbar 50. (Directional words such as "radially," "laterally," "outwardly," "inwardly" and "tangentially" are employed by way of description and not limitation with respect to the horizontal axis of rotation of the wheel.) Leg 124 is offset from the axis of rod 40 on which crossbar 50 is mounted so that cam follower roller 122 is aligned with the axis of rod 40. Each cam follower roller 122 on each crossbar 50 thus is associated, in the illustrated exemplary embodiment, with two molds 52 located on opposite sides of wheel 22. A cam 126 preferably is disposed along the lower arc of the periphery of wheel 22, as best seen in FIG. 2, for engaging cam follower rollers 122 in sequence as wheel 22 rotates around its horizontal axis. During counterclockwise rotation of wheel 22, in the orientation of FIG. 2, follower rollers 122 of each pair of molds 52 in sequence are engaged and captured by cam 126 to pull second mold segments 56 outwardly and downwardly away from first mold segments 54. When each mold in turn is fully open, molded parts or articles are removed from the mold cavities by a suitable part removal mechanism 128 (FIG. 1). A new mold charge is then placed within each mold cavity by a suitable charge placement apparatus 130. As wheel 22 continues rotation, second mold segments 56 in sequence are moved upwardly and inwardly to their closed positions with respect to first mold segments 54 by the counterclockwise end of cam 126, again in the orientation of FIG. 2. Molded article removal apparatus 128 and mold charge placement apparatus 130 may be of any suitable types. For example, mold charge placement apparatus 130 may be a disk-type apparatus of the type illustrated in U.S. Pat. No. 5,603,964. As an alternative, exemplary mold charge placement devices 130 and molded part removal devices 128 may be as disclosed in the above-referenced U.S. application. Hydraulic, pneumatic or electric actuators could be used on each spoke 38, instead of cam 126, to move the second mold segment radially inwardly or outwardly. Referring to FIGS. 1, 3D, each spoke 38 preferably carries a latch 132 for locking the mold sections to each other in the fully closed position so that there is no need for cam 126 to extend entirely around the periphery of wheel 22.

As the second or female mold segment is pulled away from the first or male mold segment, downwardly in the embodiment illustrated in FIGS. 3A and 4, this motion of the second or female mold segment strips the molded part from the first or male mold segment in this embodiment. Referring in particular to FIGS. 3A-3B, a collar 150 is seated in a recess 152 adjacent to the radially outer end of each stripper sleeve 76. A pair of rods 154 extend from each collar 150 through associated slide passages in crossbar 50 and carry associated abutment collars 156 disposed radially outwardly of the crossbar. As second mold segment 56 and crossbar 50 are pulled by cam 126 away from first mold segment 54, crossbar 50 approaches abutment collars 56. When crossbar 50 has been pulled far enough away from first mold segment 54 to abut collars 156, further motion of crossbar 50 pulls stripper sleeve 76 along sleeve 60 and core 58 toward the second mold segment so as to push or strip the molded closure shell from core tip 62. It will be noted in FIG. 3A in particular that there preferably is lost motion between crossbar 50 and abutment collars 156 to ensure that second mold segment 56 has cleared core tip 62 before moving stripper sleeve 76 to strip the part from the core trip. Each spring 82 (FIGS. 3B and 4) biases the associated stripper sleeve 76 toward second mold segment 56 so as to assist stripping of the molded closure shell. In this connection, as second mold segment 56 is closed by cam 126, the open edge of cavity insert 100 preferably engages the opposing end of stripper sleeve 76 and pushes the stripper sleeve against the force of coil spring 82. Abutment collars 156 preferably are adjustably slidably positionable on rods 154 to adjust the amount of lost motion between crossbar 50 and stripper sleeve 76 to a desired level. Crossbar 50, rods 154 and stripper sleeves 76 prevent rotation of rod 40 within spoke 38. Cam 126 may comprise a single solid cam structure, but preferably includes an over-pressure release as shown in FIG. 2.

Figure 5A:
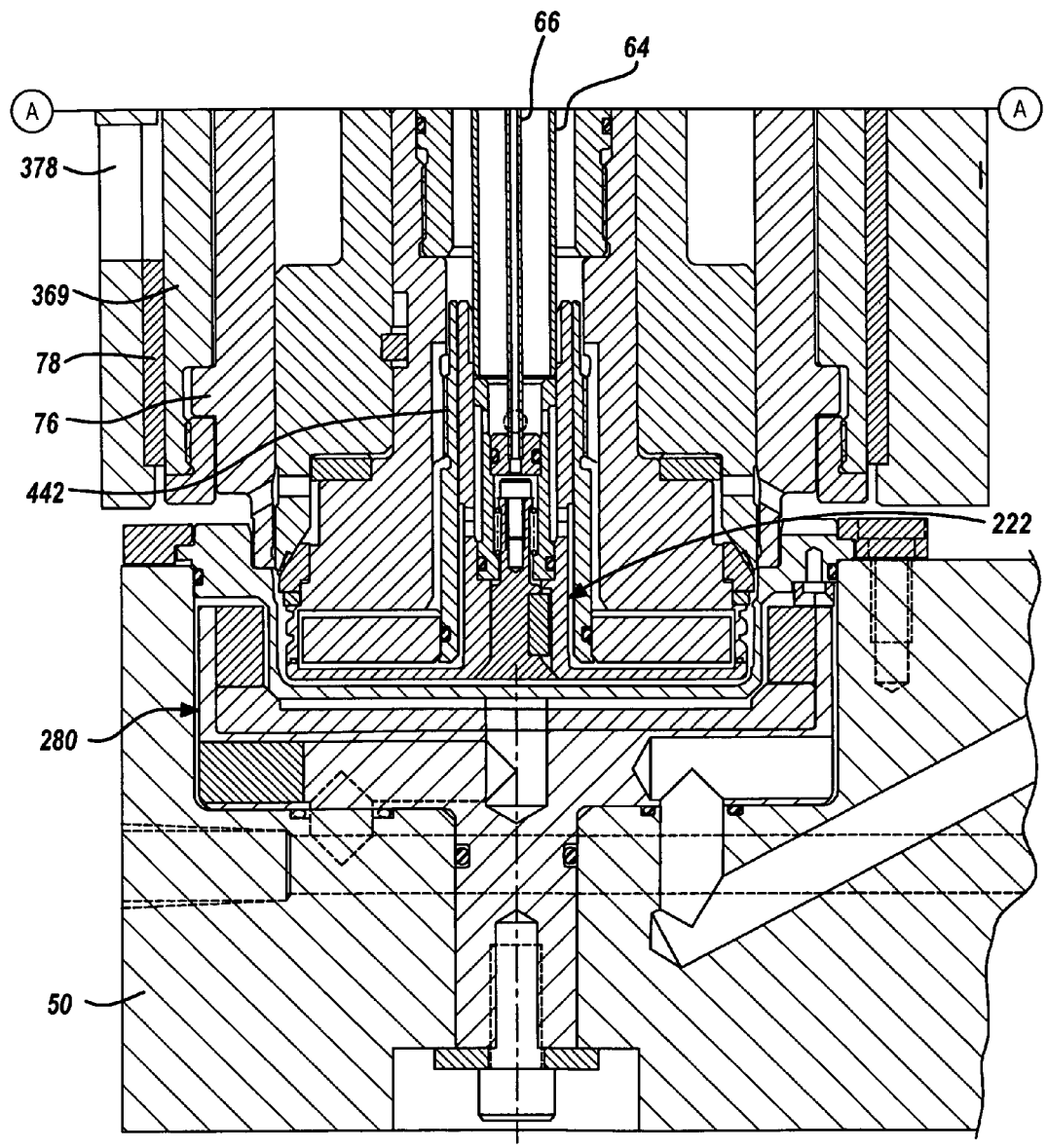
FIGS. 5A and 5B together form a sectional view of a modification to FIGS. 3A-3D.
Figure 5B:
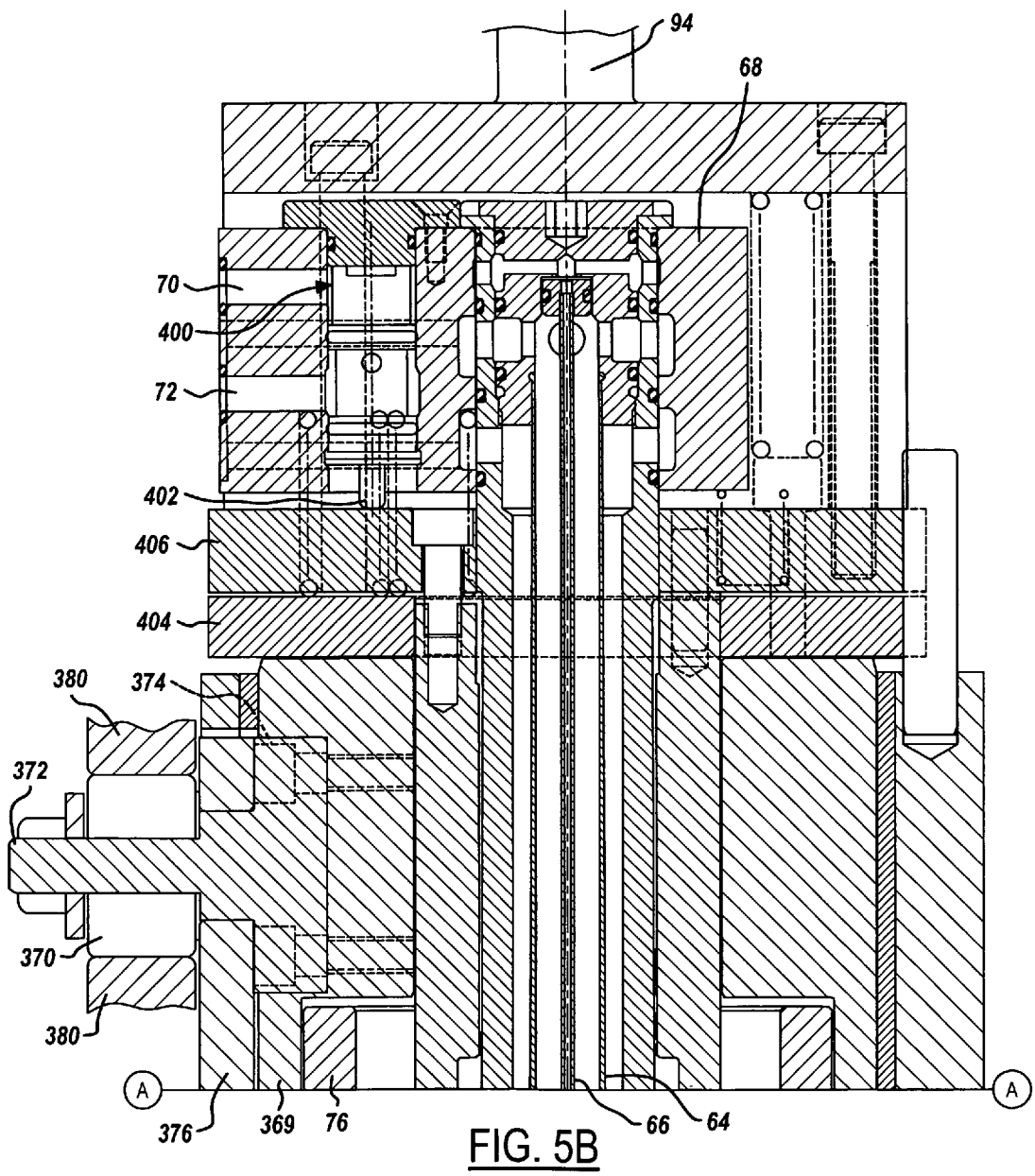

FIGS. 5A-5B illustrate a modification to the male and female mold tool stack of FIGS. 3A-3B and 4. First or male mold segment 54 includes a mold core 220 that will be described in detail in connection with FIGS. 6-6E. Mold core 220 is surrounded by sleeve 60, which in turn is surrounded by stripper sleeve 76. Stripper sleeve 76 is mounted within support 46 by a stripper sleeve body 369 and bearings 78. A cam roller 370 is rotatably mounted on a shaft 372 that is secured to stripper sleeve body 369 by screws 374. A stripping stop 376 surrounds shaft 372 and is slidable in a slot 378 on support 46. During rotation of wheel 22 (FIGS. 1-2), when the mold segments are open, cam roller 370 engages a cam 380 adjacent to the wheel to move stripper sleeve radially outwardly (downwardly in FIGS. 5A-5B) to strip the molded closure shell off of mold core 220. Thus, in this embodiment, the stripper sleeve is activated by a separate cam 380 rather than by motion of second or female mold segment 56 as in the prior embodiment. Female mold segment 56, including mold cavity 280, is described in connection with FIGS. 7A and 7B. A spool valve 400 (FIG. 5B) is carried by manifold 68 and has an actuator pin 402 coupled to a stripper plate 404 through a spring retainer 406 to feed air under pressure through tube 66 as stripper sleeve 76 is actuated to assist stripping of the closure shell.

Figures 6, 6A:
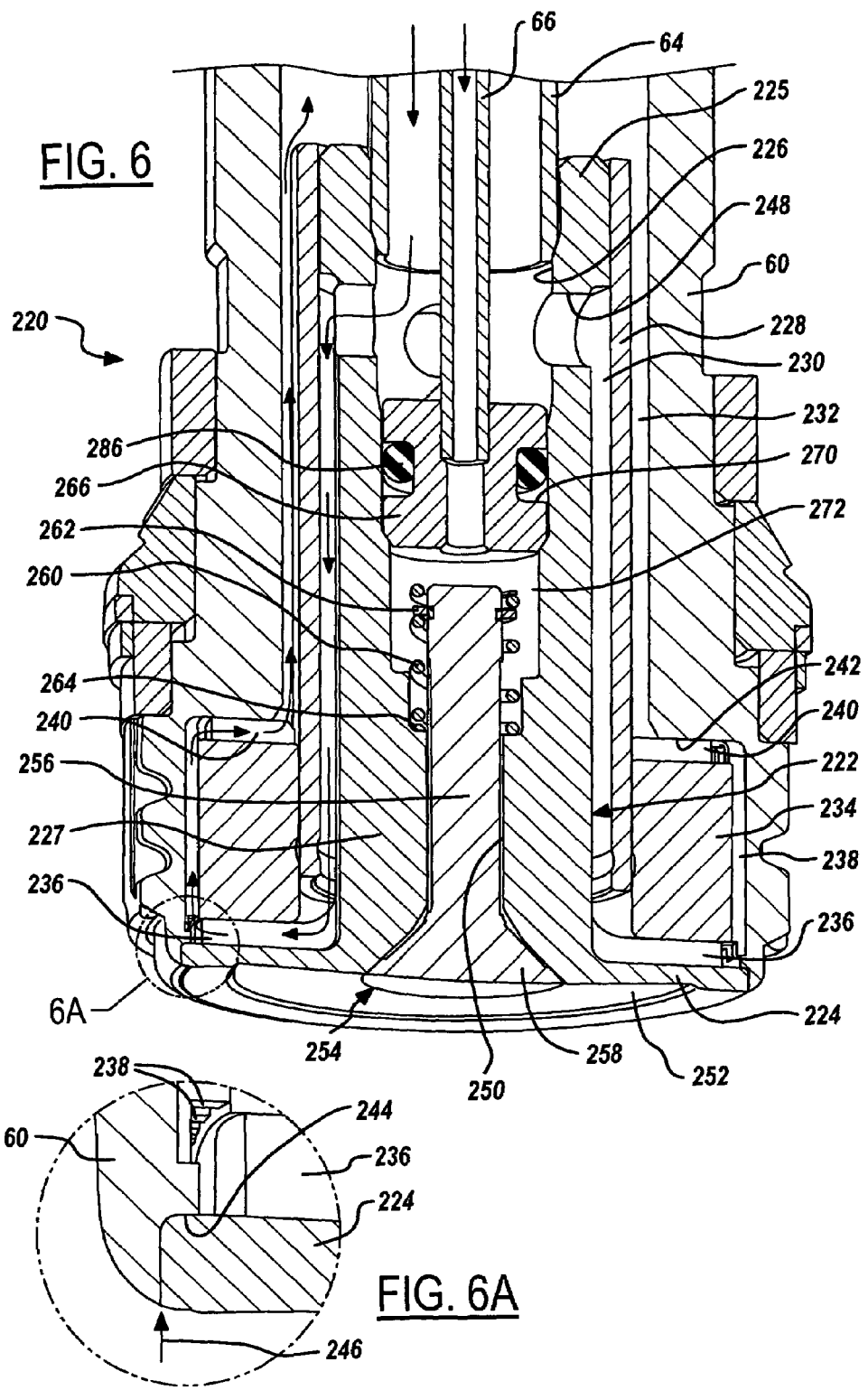
FIG. 6 is a fragmentary sectional view on an enlarged scale of a modification to the mold core in the embodiment of FIGS. 5A-5B.
FIG. 6A is an enlarged view of the portion of FIG. 6 within the area 6A.
Figure 6B:
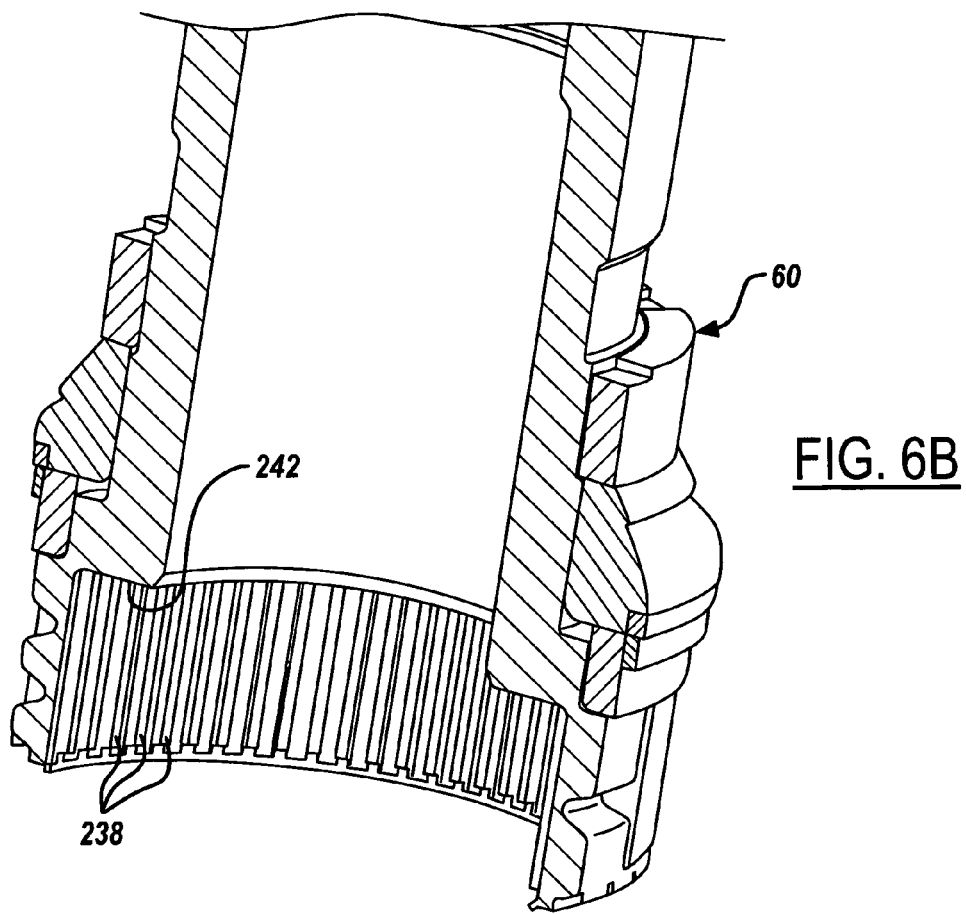
FIGS. 6B-6E are sectional views of components in the mold core of FIG. 6.
Figure 6C:
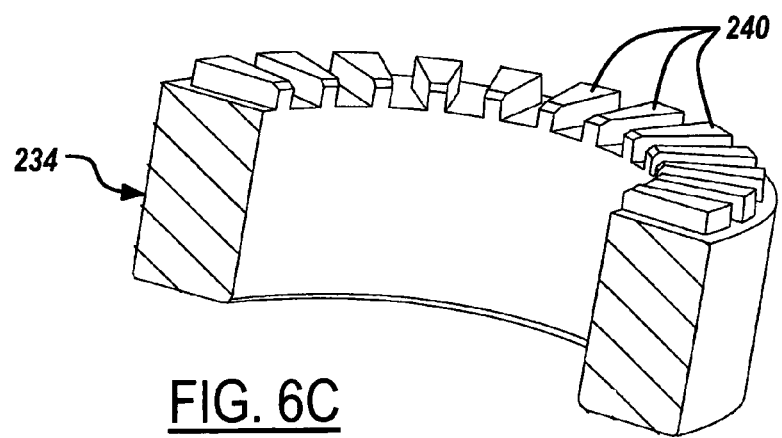
Figure 6D:
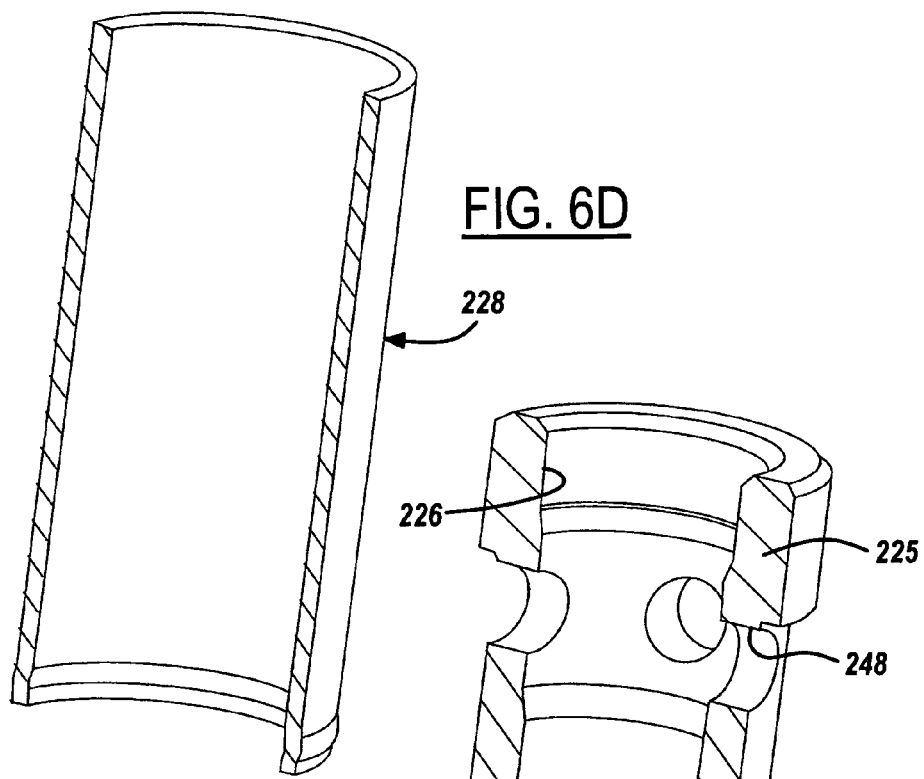
Figure 6E:
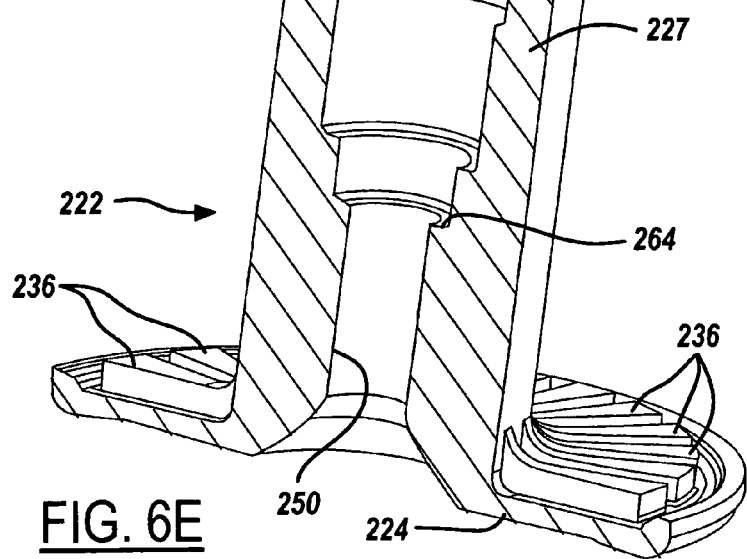

FIGS. 6-6E illustrate a mold core 220 (FIG. 5A) in accordance with another aspect and embodiment of the disclosure. Elements in FIGS. 6A-6E that are identical or similar to elements previously discussed, particularly in connection with FIG. 5A, are indicated by correspondingly identical reference numerals. Mold core 220 includes a forming pin 222 (FIGS. 6 and 6E) having an end wall 224 contoured to form the molded component in question, such as the interior of a closure shell base wall or the interior surface of a sealing liner in accordance with some preferred implementations of the disclosure. The end 225 of core forming pin 222 opposed to end wall 224 forms a hollow interior 226 that preferably is concentric with forming pin sleeve 60 (FIGS. 6 and 6B). The external surface of end 225 extends radially outwardly from the body 227 of the forming pin, and a sleeve 228 (FIGS. 6 and 6D) extends axially from core pin end 225 surrounding body 227. Thus, there is a first annular passage 230 between sleeve 228 and body 227 of forming pin 222, and a second annular passage 232 between the radially outer surface of sleeve 228 and the inner surface of sleeve 60. The end of sleeve 228 preferably is spaced from the interior surface of pin end wall 224, and a ring 234 (FIGS. 6 and 6C) is secured around the end of sleeve 228. Ring 234 preferably is disposed in an annular pocket within the end of sleeve 60. Sleeve 228 can be connected to end 225 and ring 234 by any suitable means, such as e-beam welding. The end of sleeve 60 has an internal shoulder 244 against which forming pin end wall 224 is seated, and the sleeve and forming pin end wall are joined at 246 (FIG. 6A), preferably by e-beam welding. Shoulder 244 prevents burn-through during welding.

The mold stack embodiment of FIGS. 5A-5B is similar to that of FIGS. 6-6E, except that the sleeve 228 is threaded at 442 to sleeve 60 in FIG. 5A, so that there is no need for e-beam welding in FIGS. 5A-5B.

A plurality of radially extending fins or ribs 236 (FIGS. 6 and 6E) preferably are formed on the inner surface of pin end wall 224. These ribs 236 extend from the outer surface of pin body 227 to a position adjacent to but spaced from the outer periphery of end wall 224. The lower surface ("lower" in the orientation of FIGS. 6 and 6C) of ring 234 preferably abuts the upper surfaces of ribs 236, so that the channels between the ribs form coolant passages between ring 234 and pin end wall 224. A circumferential array of angularly spaced axially extending ribs 238 (FIGS. 6 and 6B) on the inside surfaces of sleeve 60 preferably abut ring 234 in assembly, so that the channels between the ribs form axial coolant passages between ring 234 and sleeve 60. A circumferential array of angularly spaced radially extending ribs or fins 240 (FIGS. 6 and 6C) on the upper surface of ring 234 (in the orientation of FIGS. 6 and 6C) preferably abut an opposing internal shoulder 242 on sleeve 60 to form radial coolant passages between ring 234 and shoulder 242. Thus, coolant preferably is circulated from within tube 64 to interior 226 of forming pin 222, through radially extending passages 248 in the forming pin into annular passage 230, axially along annular passage 230, through the radially extending passages formed by ribs 236 between end wall 224 and ring 234, axially through the channels formed by ribs 238 between ring 234 and sleeve 60, radially inwardly through the channels formed by ribs 240 between ring 234 and shoulder 242, and thence axially through annular passage 232 to the coolant return. (The coolant flow direction less preferably can be reversed.) The cross-sectional area to coolant flow preferably is at a minimum in the axial channels formed by ribs 238 between ring 234 and sleeve 60 to maximize the heat transfer in this area.

In accordance with another aspect of the present disclosure, forming pin 222 may have a concentric axial passage 250 (FIGS. 6 and 6E) that extends from interior 226 to the end face 252 of end wall 224. A poppet valve 254 (FIG. 6) has an axially extending cylindrical body 256 that extends through passage 250, and an enlarged conical head 258 adjacent to end face 252. A coil spring 260 preferably is captured in compression between a retaining ring 262 on valve body 256 and an opposing axially facing surface 264 on pin body 227 within interior 226. Thus, spring 260 normally holds valve 254 in the closed position illustrated in FIG. 6. Air tube 66, which preferably is concentrically disposed within coolant tube 64, is coupled to a collar 266 disposed within hollow interior 226 of core pin 222 between openings 248 and valve 254. A resilient sealing ring 268 preferably is disposed within a channel 270 on collar 266 in sealing engagement with the opposed interior surface of pin interior 226. Collar 266 with sealing ring 268 cooperates with the hollow interior of forming pin 222 to form a sealed air cavity 272 that is connected to air tube 66. When tube 66 (or any other suitable passage) is supplied with air under pressure (e.g., by spool valve 400 in FIG. 5B), poppet valve 254 moves outwardly against the force of spring 260. This bodily movement of the poppet valve not only itself assists stripping of molded articles from end of core pin 220, but also feeds air under pressure through end wall 224 further to assist stripping of the molded articles. In this connection, it will be recognized that poppet body 256, 258 could be actuated mechanically, such as by a rod, rather than by air pressure.

Figure 7A:
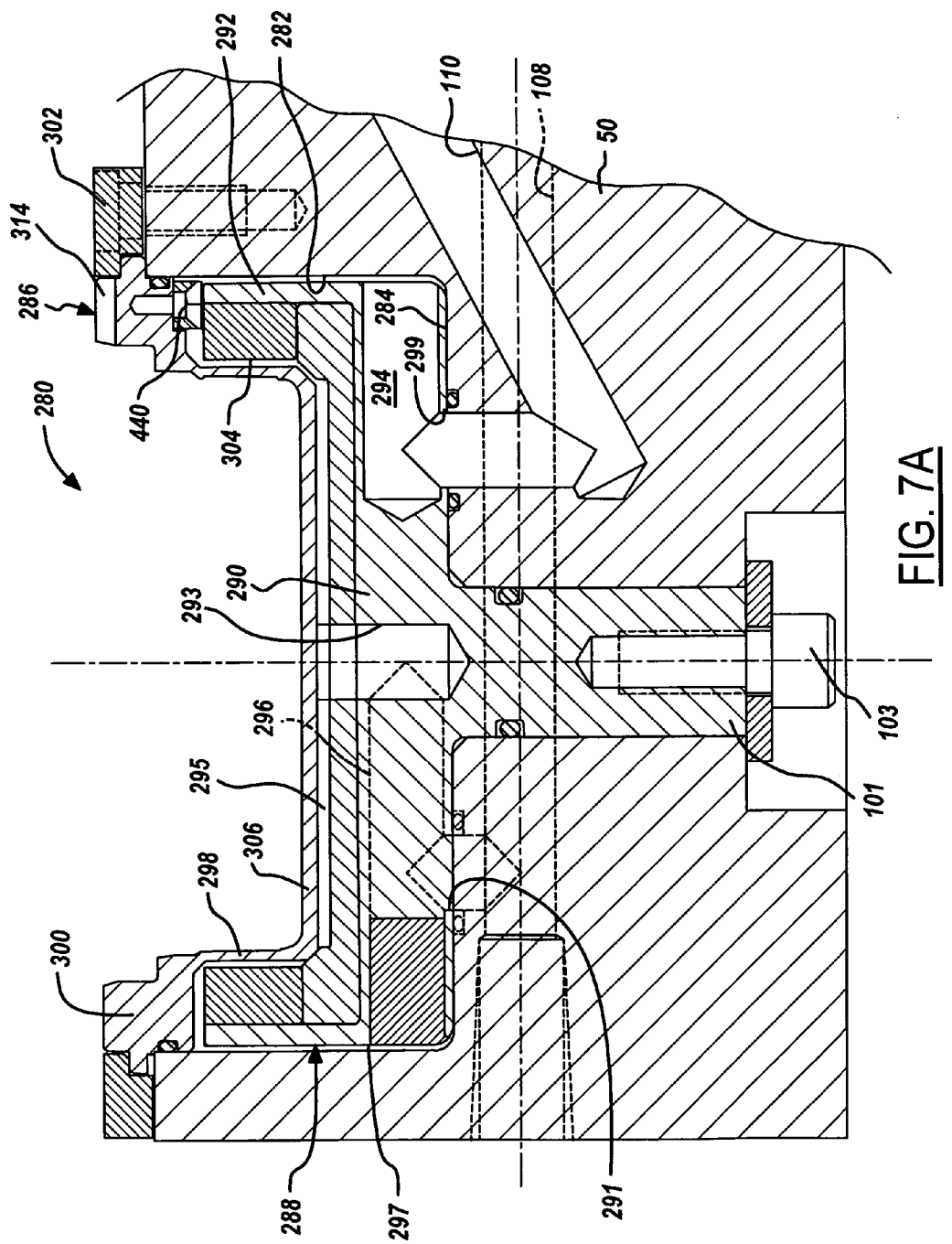
FIG. 7A is a fragmentary sectional view that illustrates the mold cavity in the embodiment of FIGS. 5A-5B.
Figure 7B:
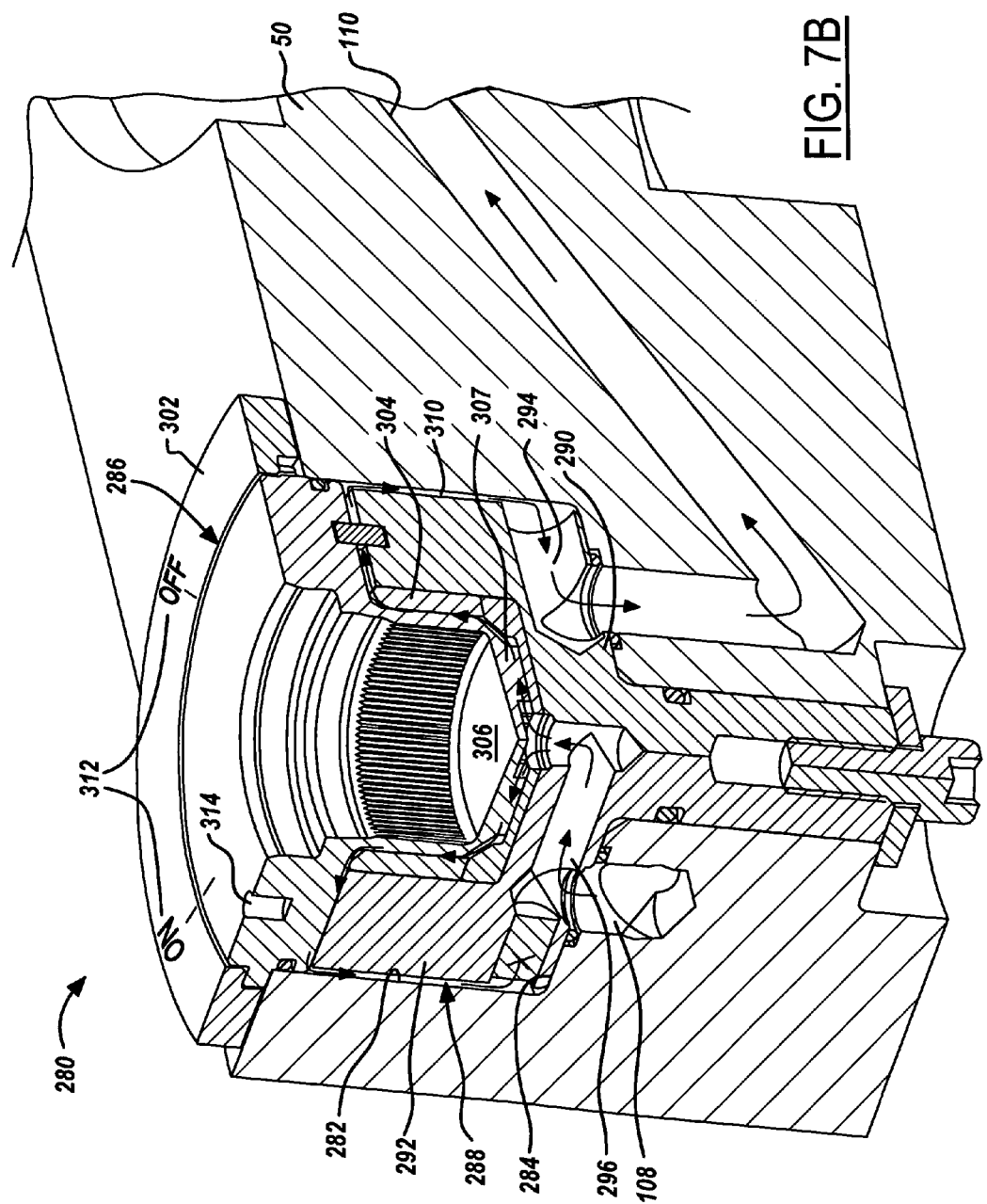
FIG. 7B is a fragmentary sectioned perspective view of the cavity and underlying support in FIG. 7A.

FIGS. 7A and 7B illustrate a mold cavity 280 in accordance with yet another aspect of the present disclosure. Mold cavity 280 preferably is disposed in a pocket 282 on crossbar 50 (or other suitable mold support structure). Coolant feed and return passages 108, 110 in crossbar 50 open at the axially facing bottom surface 284 of pocket 282. Mold cavity 280 preferably includes a mold cavity insert 286 secured within a mold cavity seat 288, most preferably by clamp ring 302. Mold cavity seat 288 preferably is cup-shaped, having an axially facing base 290 opposed to bottom surface 284 of pocket 282, and an annular rim 292 with a radially outwardly facing surface opposed to the radially inwardly facing surface of pocket 282. Base 290 of seat 288 has a first opening 291 that opens to coolant passage 108 in bar 50. Opening 291 communicates through passage 296 and a central passage 293 to a cup-shaped space 295 between the upper surface of seat 288 and the undersurface of insert 286. This cup-shaped space 295 communicates around the edge of seat 288 with an annular space 297 between the outer periphery of seat 288 and the inner periphery of pocket 282. This space 297 connects through a passage 294 with an opening 299 in base 290, and thence to coolant passage 110 in bar 50. Seat 288 extends at 101 for securement to crossbar 50 by screw 103, as previously described. Cavity insert 286 preferably is generally cup-shaped, having a body 298 within rim 292 of seat 288, and a radially outwardly extending lip or flange 300 that overlies the end of seat 288. Rim 300 is secured to crossbar 50 by a cavity retaining ring 302. Thus, coolant can circulate from passage 108 in crossbar 50 through opening 291 and passage 296 in seat base 290, through passage 293 to space 295, through passages 297 and 294, and through opening 299 to passage 110 in bar 50. (Coolant flow could be in the reverse direction.)

In accordance with a preferred feature of this aspect of the disclosure, cavity insert 286 and seat 288 are rotatable conjointly and bodily within pocket 282 of crossbar 50 selectively to move cavity 280 between the position illustrated in FIGS. 7A and 7B for permitting circulation of coolant, and an angularly spaced position for blocking circulation of coolant. A key 440 (FIG. 7A) couples cavity insert 286 to seat 288 so that the insert and seat rotate together. For this purpose, indicia 312 preferably are provided on insert rim 300 and retaining ring 302 to indicate whether mold cavity 280 is open or closed to coolant circulation. Pockets 314 or the like preferably are provided in insert rim 300 for cooperation with a suitable tool to rotate the cavity between the open and closed positions for coolant circulation. Thus, ring 302 may be loosened and the cavity insert and seat rotated conjointly so that openings 291, 299 in seat 288 no longer register with passages 108, 110 in bar 50.

There thus have been disclosed a machine and method for compression molding plastic articles, which fully satisfy all of the objects and aims previously set forth. The disclosure has been presented in conjunction with several presently preferred embodiments, and a number of additional modifications and variations have been discussed. Other modifications and variations readily will suggest themselves to persons of ordinary skill in the art. The disclosure is intended to embrace all such modifications and variations as fall within the spirit and broad scope of the appended claims.

The invention claimed is:

1. A machine for compression molding plastic articles, which includes:
   a wheel mounted for rotation around an axis,
   a plurality of angularly spaced molds, each including a first mold segment, and a second mold segment,
   each of said second mold segments being movable with respect to the associated first mold segment between a closed position with said first mold segment and an open position spaced from the associated first mold segment for removing a molded article from said mold and placing a mold charge into said mold,
   one of said mold segments being a mold cavity including a mold cavity seat and a mold cavity insert within said seat,
   said seat and said insert having opposed surfaces that form first coolant passages between said seat and said insert,
   said seat having second coolant passages for connection to the coolant passages in said wheel for circulating coolant from said wheel through said cavity and back to said wheel,
   wherein said second coolant passages in said seat are such that said mold cavity, including said seat and said insert, is adapted to be rotated selectively to open and close said first and second passages to circulation of coolant.

2. The machine set forth in claim 1 including indicia on said cavity for registry with indicia on said wheel to indicate whether said first and second passages are open or closed to coolant circulation.

3. A mold cavity adapted to be received in a pocket on a molding machine having coolant feed and return passages opening into said pocket, said mold cavity including:
   a mold cavity seat adapted to be received in the pocket and a mold cavity insert within said seat,
   said seat and said insert having opposed surfaces that form first coolant passages between said seat and said insert,
   said seat having second coolant passages for connection to the feed and return passages in the machine for circulating coolant from the machine through said cavity and back to the machine,
   wherein said second coolant passages in said seat are such that said mold cavity, including said seat and said insert, is adapted to be rotated within the machine pocket selectively to open and close said first and second passages to circulation of coolant from the support.

4. The mold cavity set forth in claim 3 including indicia on said cavity for registry with indicia on the support to indicate whether said first and second passages are open or closed to coolant circulation.

5. The mold cavity set forth in claim 3 adapted to be received within a cup-shaped pocket in the machine in which the coolant flow and return passages open to a bottom surface of the cup-shaped pocket, wherein said seat has an undersurface with openings for connecting said first and second passages to the openings in the machine.

* * * * *